United States Patent
Peng et al.

(10) Patent No.: US 7,689,971 B2
(45) Date of Patent: Mar. 30, 2010

(54) METHOD AND APPARATUS FOR REFERENCING THREAD LOCAL VARIABLES WITH STACK ADDRESS MAPPING

(75) Inventors: Jinzhan Peng, Beijing (CN); Xiaohua Shi, Beijing (CN); Guei-Yuan Lueh, San Jose, CA (US); Gansha Wu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1182 days.

(21) Appl. No.: 10/916,160

(22) Filed: Aug. 9, 2004

(65) Prior Publication Data

US 2006/0031810 A1    Feb. 9, 2006

(51) Int. Cl.
G06F 9/44 (2006.01)
G06F 9/45 (2006.01)
G06F 9/46 (2006.01)
G06F 12/10 (2006.01)
G06F 9/26 (2006.01)

(52) U.S. Cl. .................. 717/120; 717/149; 718/102; 718/107; 707/206; 711/202

(58) Field of Classification Search .............. None
See application file for complete search history.

(56) References Cited

U.S. PATENT DOCUMENTS

| | | | | |
|---|---|---|---|---|
| 5,950,221 A | * | 9/1999 | Draves et al. | 711/100 |
| 6,820,261 B1 | * | 11/2004 | Bloch | 718/100 |
| 7,111,294 B2 | * | 9/2006 | Steensgaard | 718/100 |
| 2006/0112374 A1 | * | 5/2006 | Oliva | 717/127 |
| 2007/0150900 A1 | * | 6/2007 | Hankins et al. | 718/108 |

OTHER PUBLICATIONS

Fang et al., "Efficient Global Object Space Support for Distributed JVM on Cluster", 2002, IEEE, pp. 1-8.*
Domani et al., "Thread-Local Heaps for Java", Jun. 20, 2002, ACM, pp. 1-12.*
Zhu et al., "JESSICA2: A Distributed Java Virtual Machine with Transparent Thread Migration Support", 2002 IEEE, pp. 1-8.*
Ulrich Drepper, "ELF Handling For Thread-Local Storage", Version 0.20, Feb. 8, 2003, Red Hat Inc., pp. 1-79.*
U.S. Appl. No. 10/780,208, filed Feb. 17, 2004, Lueh et al.

* cited by examiner

*Primary Examiner*—Michael J Yigdall
*Assistant Examiner*—Ben C Wang
(74) *Attorney, Agent, or Firm*—Trop, Pruner & Hu, P.C.

(57) ABSTRACT

Methods and apparatuses provide for referencing thread local variables (TLVs) with techniques such as stack address mapping. A method may involve a head pointer that points to a set of thread local variables (TLVs) of a thread. A method according to one embodiment may include an operation for storing the head pointer in a global data structure in a user space of a processing system. The head pointer may subsequently be retrieved from the global data structure and used to access one or more TLVs associated with the thread. In one embodiment, the head pointer is retrieved without executing any kernel system calls. In an example embodiment, the head pointer is stored in a global array, and a stack address for the thread is used to derive an index into the array. Other embodiments are described and claimed.

16 Claims, 3 Drawing Sheets

METHOD AND APPARATUS FOR REFERENCING THREAD LOCAL VARIABLES WITH STACK ADDRESS MAPPING

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present disclosure relates generally to the field of data processing, and more particularly to multithreading, with regard to methods and related apparatuses for referencing thread local variables.

BACKGROUND

In the field of computer software, the term "process" generally refers to a coherent sequence of steps or instructions undertaken by a computer program or application. From the perspective of a user, a data processing system may support multiple processes concurrently. For example, the processes that are executing concurrently in a data processing system may include an Internet browser application and a word processing application.

In addition, an application may utilize a technique known as "multithreading" to run two or more parts of a particular process concurrently, or virtually concurrently. For instance, a web browser process may launch two separate threads to download data from two different sources concurrently. Each of those threads may include a separate copy of a certain subset of instructions from the overall application. For example, each thread may include the instructions for a download function within the web browser application.

The local variables of each thread are typically unique. Thus, if two separate instances of a function are executing in two separate threads, each thread may include a distinct set of the local variables associated with that function. On the other hand, static variables and global variables are typically shared by all of the threads in a process.

Function local storage and thread local storage are two mechanisms that may be used to store local variables for a thread. With thread local storage, one can provide unique data for each thread in a process. The variables of a thread that reside in thread local storage may be referred to as "thread local variables" or simply "TLVs." Under some operating systems, before TLVs can be defined, the process must allocate an index known as a "global index," and that index must then be used to access any TLVs.

Many multithreaded applications use TLVs widely. For example, when supporting multithreaded Java applications, runtime systems such as Java virtual machines (JVMs) often use TLVs for tasks such as exception handling, garbage collection (GC), and runtime helper routines. Furthermore, a runtime system may access these variables frequently when running Java applications. For instance, when an exception is thrown from a method of the Java application, the JVM needs to perform stack unwinding to the method's previous (caller) frame, in case the thrown exception is not caught or handled by the current method. Unwinding operations are also required for GC, for instance to find the root set of live references during root set enumeration and to fill in the stack trace information for an exception object. One common mechanism in runtime systems for handling exception and stack unwinding is to use TLVs to record the contexts or activation records of the active Java methods of each live thread. TLVs may be used to implement various data structures, including linked lists, for instance.

In conventional systems, one constraint associated with TLVs is that threads must use a kernel system call to access the TLVs. For instance, a kernel system call (e.g., pthread_getspecific) is required to acquire a TLV head pointer in thread packages such as Linux pthread. A disadvantage associated with needing to use kernel system calls to access TLVs is that kernel system calls typically adversely affect the performance of a system, due to trapping into kernel mode or privileged mode. Such traps impose high overhead due to operations such as cache flushes, etc.

BRIEF DESCRIPTION OF THE DRAWINGS

The features and advantages of the present invention will become apparent from the appended claims and the following detailed description of one or more example embodiments, in which:

DETAILED DESCRIPTION

The present disclosure describes one or more example embodiments of methods and apparatuses which support referencing of thread local variables with little or no need for system kernel calls.

Figure 1:
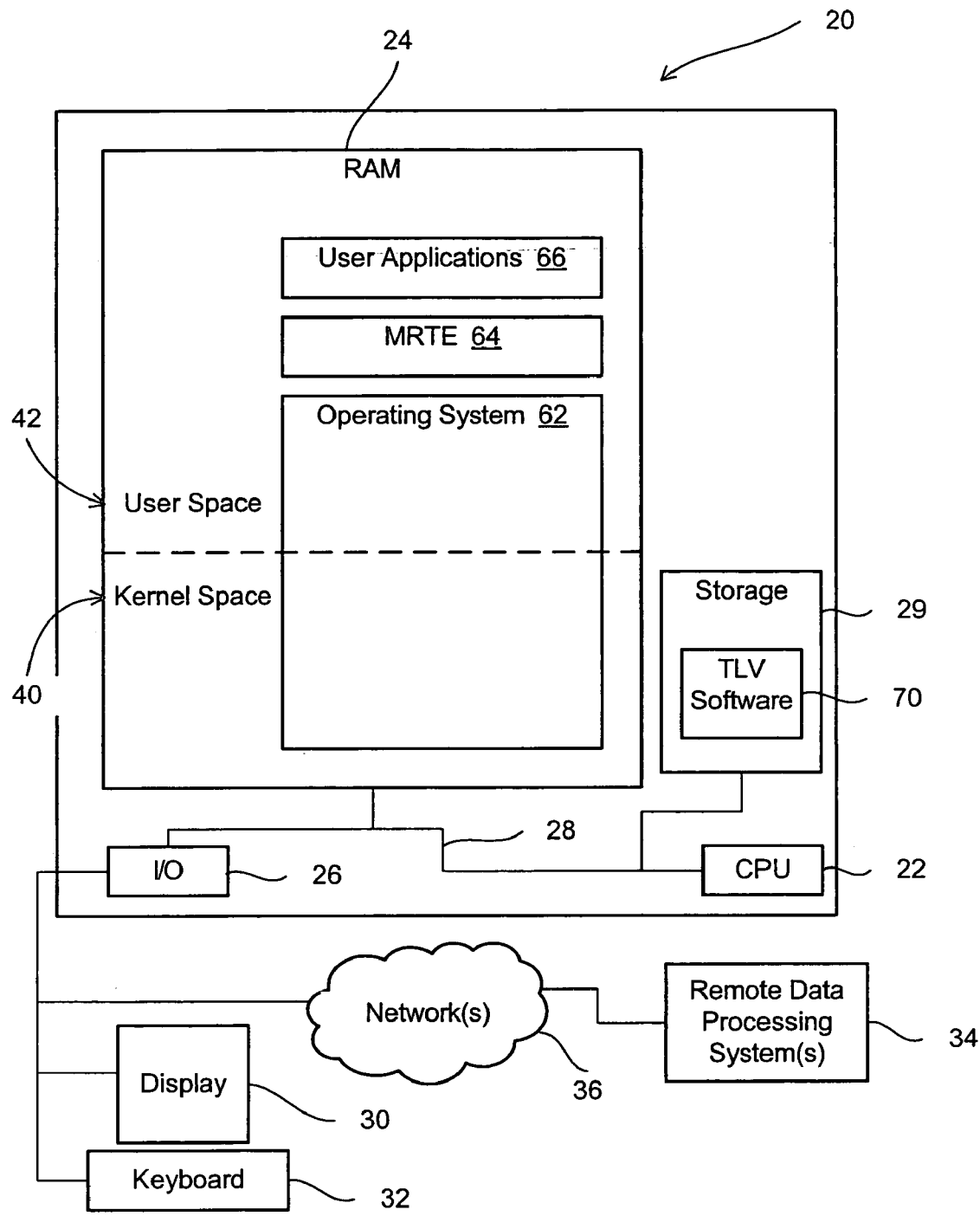
FIG. 1 is a block diagram depicting an example embodiment of a suitable data processing environment in which certain aspects of the invention may be implemented.

FIG. 1 and the following discussion are intended to provide a general description of a suitable environment in which certain aspects of the present invention may be implemented. As used herein, the terms "processing system" and "data processing system" are intended to broadly encompass a single machine, or a system of communicatively coupled machines or devices operating together. Exemplary processing systems include, without limitation, distributed computing systems, supercomputers, computing clusters, mainframe computers, mini-computers, client-server systems, personal computers, workstations, servers, portable computers, laptop computers, tablet processing systems, telephones, personal digital assistants (PDAs), handheld devices, entertainment devices such as audio and/or video devices, and other devices for processing or transmitting information.

The data processing environment of FIG. 1, for example, may include a processing system 20 that includes one or more processors or central processing units (CPUs) 22 communicatively coupled to various other components via one or more buses 28 or other communication conduits or pathways. Such components may include one or more volatile or non-volatile data storage devices, such as random access memory (RAM) 24, read-only memory (ROM), mass storage devices 29 such as integrated drive electronics (IDE) hard drives, and/or other devices or media, such as floppy-disks, optical storage, tapes, flash memory, memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc.

The components coupled to processor 22 in processing system 20 may also include one or more PCI root bridges and one or more PCI-to-PCI bridges. One or more of the above bridges and buses may be used to connect processor 22, either directly or indirectly, with storage devices and with additional components, such as one or more input/output (I/O) devices, ports, or controllers 26. Such devices may include a video controller, a small computer system interface (SCSI) controller, a network controller, a universal serial bus (USB) controller, a keyboard controller, etc.

In one embodiment, one or more devices may be implemented as embedded controllers, using components such as programmable or non-programmable logic devices or arrays, application-specific integrated circuits (ASICs), embedded computers, smart cards, and the like. For instance, a PCI root bridge may be implemented as an embedded device, residing on a system backplane or motherboard.

Processing system 20 may be controlled, at least in part, by input from conventional input devices, such as a keyboard 32, a mouse, etc., and/or by directives received from one or more remote data processing systems 34, interaction with a virtual reality (VR) environment, biometric feedback, or other input sources or signals. Processing system 20 may send output to components such as a display device 30, remote data processing system 34, etc. Communications with remote data processing system 34 may travel through any suitable communications medium. Processing systems may be interconnected by way of a physical and/or logical network 36, such as a local area network (LAN), a wide area network (WAN), an intranet, the Internet, etc. Communications involving network 36 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which when accessed by a machine result in the machine performing tasks or defining abstract data types or low-level hardware contexts. The data may be referred to in general as software, and it may be stored in volatile and/or non-volatile data storage.

For instance, in the illustrated embodiment, storage 29 includes one or more sets of instructions 70 to support referencing of TLVs with little or no need for system kernel calls. For purposes of this document, those instructions may be referred to as "TLV software" 70. In the example embodiment, TLV software 70 may reside partially or completely within one or more libraries for a JVM or other managed runtime environment (MRTE) 64, which may operate logically on top of an operating system (OS) 62. In one embodiment, TLV software 70 may be copied from storage 29 to RAM 30 along with MRTE 64 when MRTE 64 is loaded. In other embodiments, software such as TLV software 70 may be loaded from other sources, such as network storage or remote data processing system 34. In alternative embodiments, TLV software 70 may reside in other places, such as in one or more user applications 66, in OS 62, or in software to operate between OS 62 and user applications 66, for example.

Figure 2:
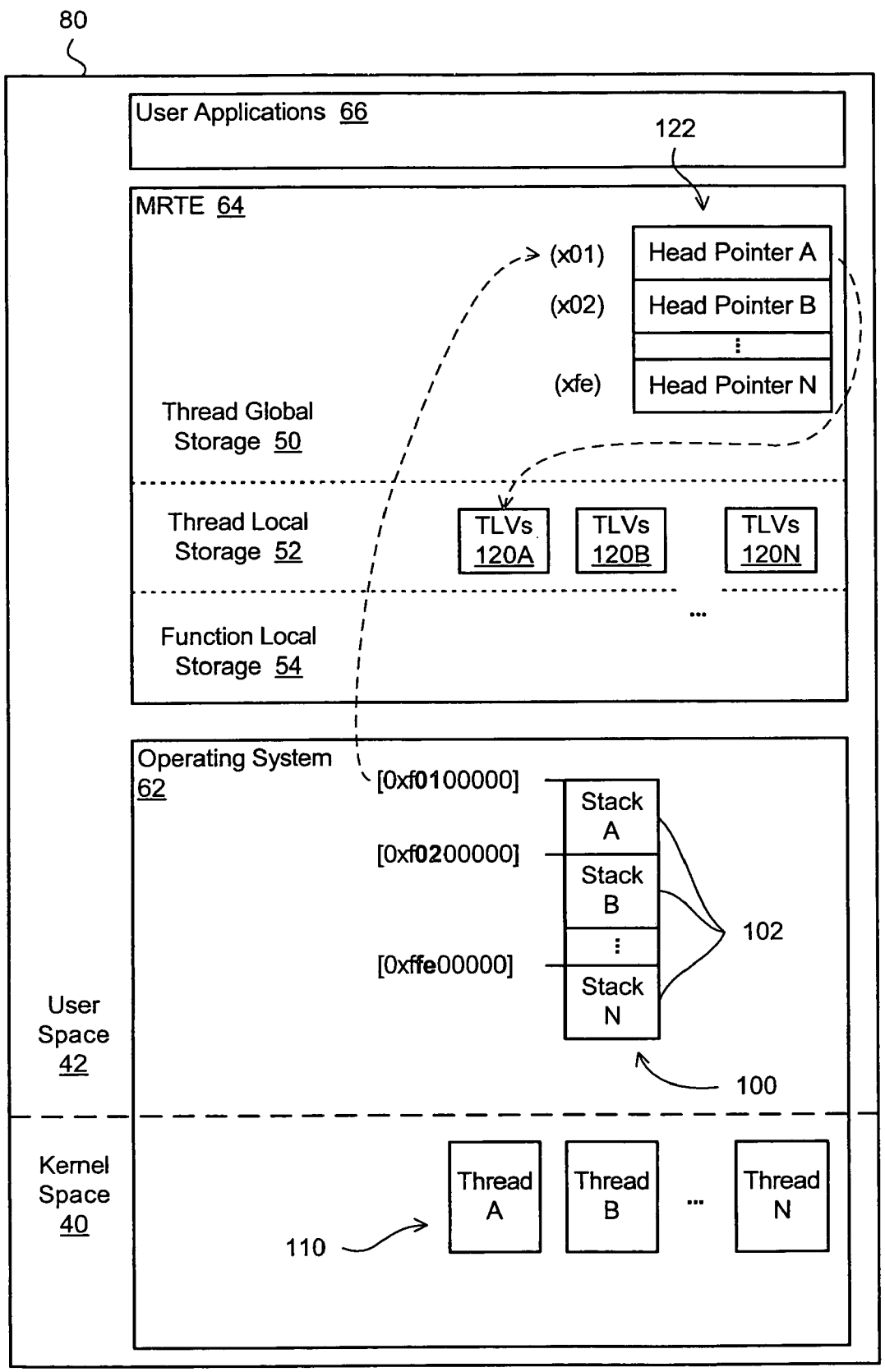
FIG. 2 is a block diagram depicting an example embodiment of the user space and kernel space from the data processing environment of FIG. 1.

FIG. 2 is a block diagram depicting an example embodiment of a software environment 80 within data processing system 20 of FIG. 1. Software environment 80 may include a user space 42 logically supported by a kernel space 40. Parts of OS 62 may operate in kernel space 40, while other parts may operate in user space 42. User applications 66, MRTE 64, and other software to operate logically between OS 62 and user applications 66 may also operate in user space 42.

In the example embodiment, OS 62 supports multiple threads 110 for a process executing within software environment 80, as illustrated within kernel space 40. For purposes of discussion, threads 110 may be referenced individually as Thread A, Thread B, etc. As illustrated by the dashed boxes within MRTE 64, portions of each thread 110 may also be accessible from user space 42.

OS 62 may maintain a process stack 100 that includes a thread stack 102 for each existing thread 110. For purposes of discussion, thread stacks 102 may be referenced individually as Stack A, Stack B, etc. OS 62 may use each thread stack 102 to store information such as program execution history or context and local data structures for the corresponding thread 110.

As illustrated with square brackets, OS 62 may allocate each thread stack 102 beginning at a distinct address, such as 0xf0100000, 0xf0200000, etc. In particular, the characteristics of one embodiment include the following: (a) each live thread 110 has its own stack space that does not overlap the stack space for any other thread 110, (b) all live threads 110 have the same maximum stack size, and (c) the starting address for each thread stack 102 is aligned with respect to the common maximum stack size. For example, threads 110 may use a thread stack size of 1 megabyte (MB), and OS 62 may align all thread stack start addresses on 0x100000 (i.e., 1 MB). The space within process stack 100 occupied by a thread stack may also be referred to as a "thread stack chunk." In the example embodiment, process stack 100 is illustrated as having been divided into N thread stack chunks 102, with each chunk having the same size and starting at an address that is aligned on a multiple of the 1 MB address.

As indicated by the dotted lines that subdivide MRTE 64 horizontally, MRTE 64 may support multiple different types of storage for the threads operating in software environment 80. For instance, MRTE 64 may support thread local storage 52 for storing TLVs, function local storage 54 for storing the local variables of a thread's functions, and thread global storage 50 for storing global variables. As illustrated by the dashed boxes within MRTE 64, individual threads (e.g., Thread A) may include variables and data in function local storage 54. Each individual thread may also include its own distinct set of TLVs, represented in FIG. 2 by TLVs 120A, 120B, . . . , 120N within Thread A, Thread B, . . . Thread N, respectively.

According to the illustrated embodiment, bits 21 through 28 of each thread stack start address can be used to distinguish and identify different threads. For example, as illustrated by the two boldface digits within each illustrated thread stack start address for thread stacks 102, the index 01 can be used to identify Thread A, since Stack A corresponds to Thread A. Likewise, the index 02 can be used to identify Thread B, and the index 254 (0xfe) can be used to identify Thread N.

In the example embodiment, a global array of head pointers 122 is created in thread global storage 50 within MRTE 64. Global array 122 may be named "thread_local_var_array," for example. When a thread 110 is created, TLV software within MRTE 64 adds a value for that thread to global array 122 at the index derived from bits 21-28 of the start address of the thread stack 102 for that thread 110. In particular, the value that is added to global array 122 is the head pointer of the TLVs for that thread. For purposes of illustration, the head pointer of the TLVs of Thread A is shown within global array 122 as "Head Pointer A", the head pointer of the TLVs of Thread B is shown as "Head Pointer B," etc.

For example, when Thread A is created, the head pointer of the TLVs of Thread A is added to global array 122 at index 01. For purposes of discussion, the individual cells within global array 122 may be referred to as records or entries.

In FIG. 2, the dashed arrow from the starting address of Stack A to the first record in global array 122 indicates that the first record in global array 122 can be associated with Thread A, based on the stack address for Thread A (i.e., based on the starting address of Stack A). The dashed arrow from the first record in global array 122 to TLVs 120A within thread local storage 52 indicates that the Head Pointer A value within global array 122 points to the TLVs for Thread A.

Similarly, when Thread B is created, the head pointer of the TLVs of Thread B are added to global array 122 at index 02, and when Thread N is created, Head Pointer N is added to global array 122 at index 254 (0xfe).

Consequently, each item in global array 122 can be indexed by thread stack addresses with simple bit mask operations. Thus, the TLV head pointer for any thread 110 can be obtained from global array 122 by simply indexing global array 122 with bits 21 through 28 of the thread stack start address for that thread. TLVs can therefore be quickly located, based on the current thread stack address.

The following program code or pseudo code depicts an example code sequence or instruction sequence to implement referencing of TLVs through use of a global array of TLV head pointers, such as global array 122.

```
1   void SET_THREAD_LOCAL_VAR (void* p_thread_local_var,
    unsigned int stack_address)
2   {
3   unsigned int stack_key;
4   stack_key = (stack_address & STACK_MASK) >>
    STACK_SHIFT_BITS;
5   thread_local_var_array[stack_key] = p_thread_local_var;
6   }
7
8   void* GET_THREAD_LOCAL_VAR (unsigned int stack_address)
9   {
10  unsigned int stack_key;
11  stack_key = (stack_address & STACK_MASK) >>
    STACK_SHIFT_BITS;
12  return thread_local_var_array[stack_key];
13  }
```

© 2004 Intel Corporation.

In the above sequence, thread_local_var_array corresponds to global array 122. The function SET_THREAD_LOCAL_VAR sets the head pointer of the TLVs for a thread. The function GET_THREAD_LOCAL_VAR returns the head pointer of the TLVs for a thread, so the head pointer may be used to access those TLVs. As indicated by the parameter stack_address, both functions use the current stack address (i.e., the stack start address for the current thread) as the basis for the index into thread_local_var_array.

Lines 4 and 11 depict a formula for mapping a thread stack address to a unique index in thread_local_var_array. In the illustrated embodiment, the thread stack address is masked with a bit mask represented by STACK_MASK, and the result is then shifted to the right by an amount represented by STACK_SHIFT_BITS. The values for data items such as STACK_MASK and STACK_SHIFT_BITS may be set as appropriate for a particular environment, OS, thread package, etc. For instance, in the example embodiment, STACK_MASK is 0x0ff00000 and STACK_SHIFT_BITS is 20.

Functions like SET_THREAD_LOCAL_VAR and GET_THREAD_LOCAL_VAR which support the operations described herein for manipulating or accessing the global array of head pointers while reducing or eliminating the need to use kernel mode processing may be referred to in general as "thread local variable functions" or simply "TLV functions." For purposes of the present disclosure, the different TLV functions and related objects, logic, etc. that may be used in different environments and implementations, such as the software associated with reference number 70 in FIG. 1, may be referred to in general as "TLV software."

Figure 3:
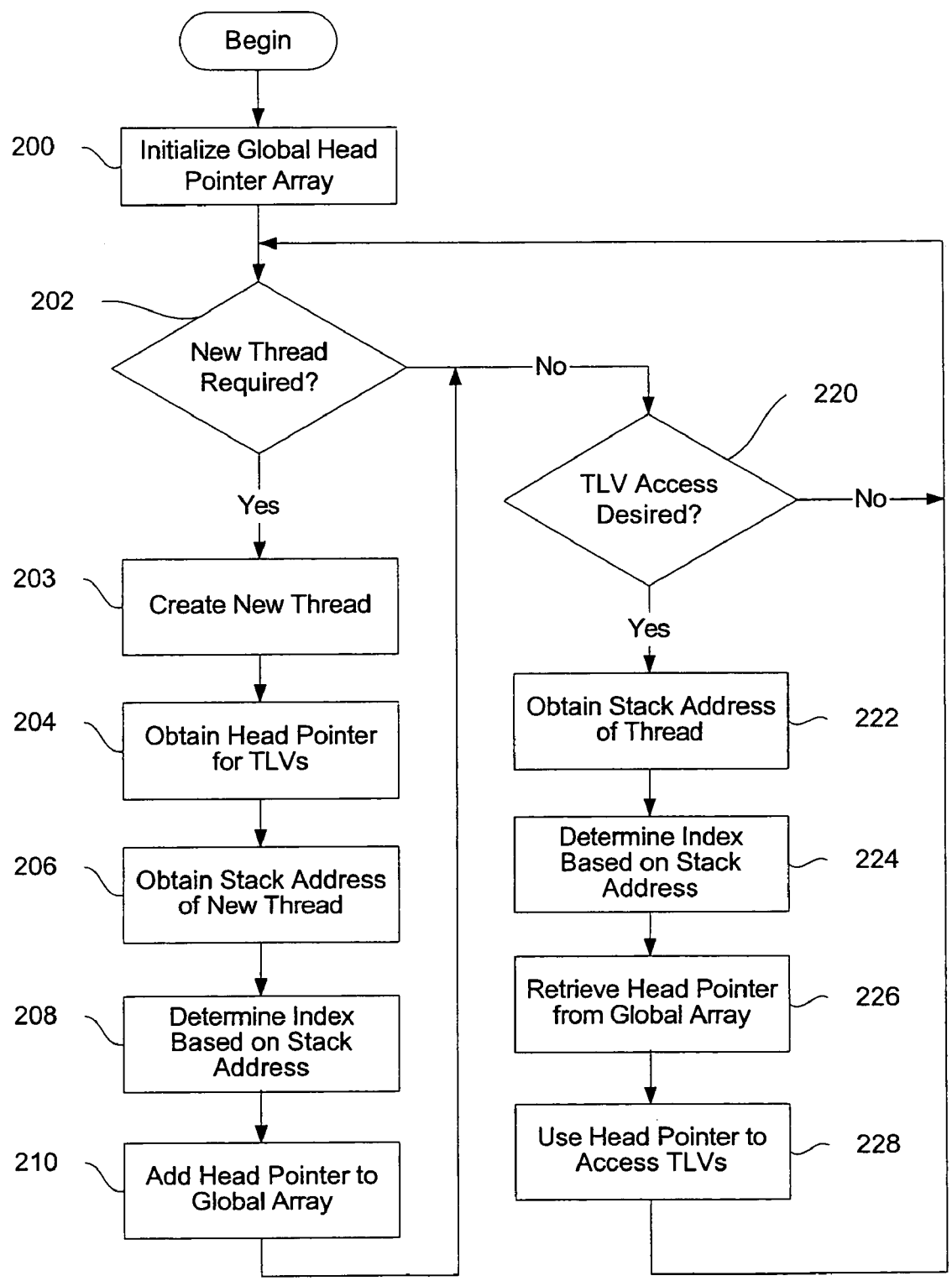
FIG. 3 is a flowchart illustrating a process for referencing thread local variables with stack address mapping, in accordance with one example embodiment of the present invention.

FIG. 3 is a flowchart illustrating a process for referencing thread local variables with stack address mapping, in accordance with an example embodiment of the present invention. That process is described with regard also to FIGS. 1 and 2. The process of FIG. 3 may begin with OS 62, MRTE 64, and one or more user applications 66 operating in processing system 20. At block 200 MRTE 64 initializes global array 122.

At block 202 MRTE 64 determines whether a new thread is required, for example in response to a request for a new thread from a user application 66. If a new thread is required, MRTE 64 creates the new thread, as indicated at block 203. In conjunction with creating the new thread, MRTE 64 obtains the head pointer for the TLVs for that thread at block 204. MRTE 64 may use a conventional OS call (e.g., a call to the function pthread_getspecific in Linux) to obtain the head pointer. Accordingly, processing system 20 may enter kernel mode when the head pointer is first being obtained.

MRTE 64 then obtains the stack address for the new thread, as indicated at block 206. At block 208, MRTE 64 uses the stack address to determine the appropriate index into global array 122 for the new thread, as described above. MRTE 64 then adds the head pointer to global array 122 at that index, as indicated at block 210.

After the head pointer has been added to global array 122, or after a negative determination at block 202, MRTE 64 may determine at block 220 whether access to one or more TLVs is desired. Alternatively, MRTE 64 may be designed to automatically use TLV software 70 to retrieve a head pointer whenever appropriate, such as in advance of instructions that will require access to a TLV. In either case, MRTE 64 may obtain the stack address for the current thread at block 222, and MRTE 64 may use that stack address to determine the appropriate index into global array 122 at block 224, as described above. MRTE 64 may then use that index to retrieve the head pointer for the current thread's TLVs, as indicated at block 226. At block 228 MRTE 64 may then use the head pointer to access one or more TLVs of the current thread, for use in processes such as stack unwinding for GC and exception handling, runtime helper routines, etc.

In the example method depicted in FIG. 3, many of the determinations and calls to TLV functions are made by MRTE 64. In alternative embodiments, however, other components may make the same or related determinations and calls to TLV functions. For instance, a user application running directly over an OS without a managed runtime environment may make the same or related determinations and calls to TLV functions. For example, a multi-threading web browser may use TLV functions for managing the state of different threads used for downloading.

As described above, TLV software 70 provides a very efficient mechanism for allowing threads to access TLVs. For instance, in one or more of the above embodiments, once TLV head pointers have been stored in global array 122, MRTE 64 allows threads to access TLVs without using any kernel system calls. In the example embodiment, access to global array 122 is always lightweight. That is, access is provided while remaining completely in user mode. Calls are made only to user space functions. MRTE 64 thus avoids the high overhead associated with trapping into kernel or privileged mode. By keeping a global array of head pointer for TLVs and using thread stack addresses to index that global array, the runtime environment allows threads to access TLVs with almost negligible overhead.

The size of the global array may vary for different implementations. Factors in determining a suitable size may include the system capability of multithreading such as the maximum number of threads, the process stack size, and the thread stack size. In one embodiment, the global array is allocated with a size equal to the process stack size divided by the thread stack size. If a thread package prefers to reuse the stack area of a destroyed thread before allocating a new stack area, the size of the global array could be the maximum number of supported threads, which may be smaller than process stack size divided by thread stack size.

A number of advantages may be provided by one or more embodiments. For instance, each thread may access only one item in global array 122 using a simple stack address mapping. The system may therefore avoid much of the overhead (e.g, searching and synchronization) associated with storing head pointers to and retrieving head pointers from more complex data structures, such as linked lists. Global array 122 may also provide improved memory locality, and memory accesses may therefore be reduced. For instance, in systems that provide a cache line of 32 bytes, 8 consecutive records from global array 122 may be loaded in the cache line at once. Relative data may therefore be referenced more quickly. Also, when destroying a thread, there is no need to clear its corresponding cell in the global array, because the cell will not be referenced until a new thread is created to occupy the stack chunk, and the old cell will then be initialized to the new head pointer of the newly created thread.

Moreover, the teachings of the present disclosure may be used to advantage in a wide variety of operating environments. For instance, the teachings may be used in a wide variety of runtime environments, including MRTEs designed for systems using Intel Corporation's XScale® technology or for any other type of data processing system. The types of MRTEs that may benefit from the teachings of the present disclosure include, without limitation, JVM runtime systems, Common Language Infrastructure environments such as Common Language Runtime (CLR), Perl/Parrot virtual machines, etc.

Moreover, the present teachings are not limited to use in runtime environments, but may be used to advantage in a wide variety of software architectures, environments, or products, including any multi-thread aware application. Examples of alternative embodiments include, without limitation, embodiments in which the operations for saving and retrieving head pointer for TLVs are implemented (a) in other types of middleware running logically between the OS level and the user application level, (b) as part of an OS, preferably to execute primarily in the user space rather than in the kernel space, and (c) as part of an end user program, application, or suite of applications.

Additionally, alternative embodiments include embodiments in which different aspects of TLVs are stored in and retrieved from a global data structure such as global array 122. For example, for user functions that do not store complex data structures in TLVs but store only simple items such as integers, the actual value could be stored in the global array, instead of storing a head pointer to the TLVs. Thus, one alternative embodiment includes a global array of TLVs, instead of or in addition to a global array of head pointers to TLVs. Alternative embodiments may also include embodiments in which data structures other than arrays are used to store the head pointers in the user space.

Accordingly, in light of the principles and example embodiments described and illustrated herein, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, it will be apparent to those of ordinary skill in the art that numerous modifications to the processes could be applied to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:

obtaining a head pointer for a kernel thread of a user space process from a kernel space of a processing system, wherein the head pointer points to a set of thread local variables (TLVs) of the kernel thread of the user space process;

storing the head pointer in a global data structure of the user space process at an index into the global data structure, based at least in part on a portion of an address of a stack for the kernel thread in a process stack maintained by an operating system (OS);

obtaining the stack address for the kernel thread of the user space process;

retrieving the head pointer from the global data structure by using the portion of the stack address as the index to retrieve the head pointer from the global data structure without causing the processing system to execute any kernel system calls; and using the head pointer retrieved from the global data structure to access a TLV associated with the kernel thread of the user space process.

2. The method according to claim 1, wherein the global data structure comprises a global array.

3. The method according to claim 2, further comprising automatically determining the index, including interpreting a predetermined portion of the address of the stack as an index value.

4. The method according to claim 1, wherein:
the operation of retrieving the head pointer from the global data structure is performed by a runtime environment; and
the method further comprises using the head pointer to facilitate garbage collection within the runtime environment.

5. The method according to claim 1, wherein:
the operation of retrieving the head pointer from the global data structure is performed by a Java Virtual Machine (JVM).

6. The method according to claim 1, wherein:
the operation of retrieving the head pointer from the global data structure is performed by a user application.

7. A method comprising:
determining a stack address associated with a thread of a process executed in user mode, the thread having a thread stack managed by an operating system executed in kernel mode; and
using a predetermined portion of the stack address to determine an index associated with a head pointer for the thread to obtain, with the process executing in user mode, the head pointer without causing the processing system to enter kernel mode, wherein the head pointer points to a set of thread local variables (TLVs) for the thread of the process executed in user mode.

8. The method of claim 7, further comprising accessing the set of TLVs using the head pointer.

9. An apparatus comprising:
a computer readable storage medium; and
instructions encoded in the computer readable storage medium, wherein the instructions, when executed by a user mode process of a processing system, perform operations comprising:
creating a thread for the user mode process at a kernel level of the processing system;
storing a head pointer in a global data structure in a user space of the processing system at an index into the global data structure, based at least in part on a portion of an address of a stack for the thread in a process stack maintained by an operating system (OS), wherein the head pointer points to a set of thread local variables (TLVs) of the thread for the user mode process;

retrieving the head pointer from the global data structure by using a portion of the stack address as the index to retrieve the head pointer from the global data structure without causing the processing system to enter kernel mode; and using the head pointer to access a TLV associated with the thread of the user mode process.

10. The apparatus according to claim 9, wherein the global data structure comprises a global array.

11. The apparatus according to claim 10, further comprising automatically determining the index, including interpreting a predetermined portion of the address of the stack as an index value.

12. The apparatus according to claim 9, further comprising:
program instructions to implement a runtime environment encoded in the computer readable storage medium; and
at least one TLV function within the program instructions to implement the runtime environment, the at least one TLV function comprising the instructions to retrieve the head pointer from the global data structure.

13. A processing system comprising:
a machine accessible computer readable storage medium;
a processor in communication with the computer readable storage medium; and
instructions encoded in the computer readable storage medium, wherein the instructions, when executed by the processor in user mode, perform operations comprising:
requesting an operating system executed in kernel mode to create a kernel thread for a process having a thread stack managed by the operating system;
receiving a head pointer for the kernel thread from the operating system of the processing system, wherein the head pointer points to a set of thread local variables (TLVs) of the kernel thread for the process;
storing the head pointer in a global data structure in a user space of the processing system at an index into the global data structure, based at least in part on a portion of an address of the thread stack;
retrieving the head pointer from the global data structure by using a portion of the thread stack address as the index to reference the head pointer from the global data structure without causing the processing system to enter kernel mode; and
using the head pointer to access a TLV associated with the kernel thread of the process.

14. The processing system according to claim 13, wherein the global data structure comprises a global array.

15. The processing system according to claim 14, further comprising automatically determining the index, including interpreting a predetermined portion of the address of the thread stack as an index value.

16. The processing system according to claim 13, further comprising:
program instructions to implement a runtime environment encoded in the computer readable storage medium; and
at least one TLV function within the program instructions, the at least one TLV function comprising the instructions to automatically retrieve the head pointer from the global data structure.

* * * * *